US006989763B2

(12) United States Patent
Wall et al.

(10) Patent No.: US 6,989,763 B2
(45) Date of Patent: Jan. 24, 2006

(54) WEB-BASED UNIVERSAL REMOTE CONTROL

(76) Inventors: Justin D. Wall, 4416 - 12th Ave., Temple, PA (US) 19560; David M. Wall, 3521 Kutztown Rd., Laureldale, PA (US) 19605

( * ) Notice: Subject to any disclaimer, the term of this patent is extended or adjusted under 35 U.S.C. 154(b) by 609 days.

(21) Appl. No.: 10/077,273

(22) Filed: Feb. 15, 2002

(65) Prior Publication Data

US 2003/0156053 A1 Aug. 21, 2003

(51) Int. Cl.
*H04N 7/18* (2006.01)
*H04N 5/44* (2006.01)
*G08C 19/12* (2006.01)

(52) U.S. Cl. ........................... 340/825.69; 340/825.72; 340/825.25; 340/825.31; 348/734; 348/134; 348/906; 341/176

(58) Field of Classification Search ................ 341/176; 340/825.69, 825, 825.31; 348/906, 734, 348/137
See application file for complete search history.

(56) References Cited

U.S. PATENT DOCUMENTS 6,104,334 A * 8/2000 Allport ....................... 341/175
6,211,870 B1 * 4/2001 Foster ........................ 715/744
6,239,968 B1 * 5/2001 Kim et al. .................. 361/679
6,313,982 B1 * 11/2001 Hino .......................... 361/679
6,384,737 B1 * 5/2002 Hsu et al. .............. 340/825.69
6,437,836 B1 * 8/2002 Huang et al. ............... 348/734
6,486,795 B1 * 11/2002 Sobel et al. ........... 340/825.72

* cited by examiner

*Primary Examiner*—Albert K. Wong

*Assistant Examiner*—Kimberly Jenkins

(74) *Attorney, Agent, or Firm*—Miller Law Group, PLLC

(57) ABSTRACT

A universal remote control apparatus that is programmable with software supplied by manufacturers of controllable devices so that a single remote control apparatus has a broad spectrum application capable of operating many different controllable devices. The remote control apparatus is based in a Personal Digital Assistant (PDA) having sufficient memory to store the requisite software from a multitude of controllable devices and is operable to send or receive signals to the controllable devices by radio signal or by infra red beam. The remote control apparatus can be coupled to a personal computer to download the requisite software into the memory of the PDA, which can come via software supplied with the controllable device or by accessing the manufacturer's web site and downloading the necessary software therefrom. The display screen of the PDA can then be customized to replicate any control functions with a touch screen actuation control buttons.

19 Claims, 4 Drawing Sheets

WEB-BASED UNIVERSAL REMOTE CONTROL

BACKGROUND OF THE INVENTION

This invention relates generally to remote control devices for controlling electrical or electronic devices, such as televisions, stereos, light switches and hot tubs and, more particularly, to a universal remote control apparatus that is programmable through the downloading of software from the computer or from the Internet to permit the remote control apparatus to control any controllable device.

Remote controls are operable through either radio frequency or an infra red link to transmit control signals to the device to be controlled. Each manufacturer of a controllable device provides its own remote control apparatus for the device to be controlled. Many electrical or electronic devices are capable of being controlled remotely, including televisions and stereos, but also light systems, hot tubs, ceiling fans and home entertainment centers. Accordingly, it would not be unusual for a household to have multiple remote control devices each one being operable to provide a remote control of a different device. The proliferation of remote controls further complicates their usage as the homeowner becomes confused as to how each remote control device operates or how the control device is to be programmed.

Some manufacturers provide a universal remote control device that is operable to control the operation of more than one electrical or electronic device. By properly programming such a universal remote control device, the remote control can provide different control frequencies or provide the proper control signals via an infra red beam to effect the remote control of at least two devices, however, all such devices will be operated by radio frequency or by infra red. Furthermore, universal remote control devices are known to be difficult to program and to utilize Accordingly, it would be desirable to provide a remote control device that is truly universal in that the remote control device would be operable to control every controllable device whether operable by radio signal or infra red beam.

SUMMARY OF THE INVENTION

It is an object of this invention to overcome the aforementioned disadvantages of the prior art by providing a universal remote control apparatus that is programmable by downloading software from a computer or Internet site.

It is another object of this invention to provide a remote control apparatus that is universal in operation by being capable of sending control signals by radio or by infra red.

It is a feature of this invention that the remote control apparatus has a memory that can store the control programming for many different controllable devices.

It is an advantage of this invention that the remote control apparatus is connectable to a computer to receive software downloaded therefrom.

It is another advantage of this invention that the remote control apparatus will be able to replace all other remote control devices.

It is another feature of this invention that the remote control apparatus has a display screen for which control buttons can be displayed for each controllable device for which remote control is desired.

It is still another advantage of this invention that the display screen can be customized by downloadable programming to mimic the manufacturer's remote control apparatus.

It is still another object of this invention to provide a remote control apparatus that can receive and store software defining the control function of multiple controllable devices.

It is still another feature of this invention that the remote control apparatus can learn control signals from a conventional infra red remote control apparatus.

It is yet another feature of this invention that the remote control apparatus can provide confirmation of the implementation of the control command that has been issued by receiving a response code from the controllable device.

It is still another advantage of this invention that the software loaded into the remote control apparatus can be edited to permit the information to be tailored to the specific needs of the operator.

It is yet another feature of this invention that the downloading of software into the remote control apparatus from a computer can be utilized to display identical information on the screen of the computer as on the display screen of the remote control apparatus to allow testing and verification of the final programming into the remote control apparatus.

It is a further feature of this invention that a Personal Digital Assistant (PDA) serves as the host for the remote control apparatus.

It is a further object of this invention to provide a remote control apparatus based on the architecture of a Personal Digital Assistant with a broad spectrum application in both infra red and radio signal to provide a universally utilizable remote control functions.

It is yet another advantage of this invention that the remote control apparatus can have a sealed housing that can be attached to a flotational device to allow the remote control apparatus to float on the surface of water, such as in a hot tub.

It is still a further advantage of this invention that the remote control apparatus can receive programming from software loaded through a computer, by connecting the remote control apparatus to the manufacturer's web site to download the requisite software into the remote control apparatus, or by receiving control signals from a conventional infra red remote control apparatus in a learn mode of operation.

It is yet a further object of this invention that the remote control apparatus has the ability to both send and receive multiple frequencies via radio signal, as well as by infra red beam.

It is yet another object of this invention to provide a remote control apparatus that is durable in construction, inexpensive of manufacture, carefree of maintenance, facile in assemblage, and simple and effective in use.

These and other objects, features and advantages are accomplished according to the instant invention by providing a universal remote control apparatus that is programmable with software supplied by manufacturers of controllable devices so that a single remote control apparatus has a broad spectrum application capable of operating many different controllable devices. The remote control apparatus is based in a Personal Digital Assistant (PDA) having sufficient memory to store the requisite software from a multitude of controllable devices and is operable to send or receive signals to the controllable devices by radio signal or by infra red beam. The remote control apparatus can be coupled to a personal computer to download the requisite software into the memory of the PDA, which can come via software supplied with the controllable device or by accessing the manufacturer's web site and downloading the necessary software therefrom. The display screen of the PDA can then be customized to replicate any control functions with a touch screen actuation control buttons. Switching from one controllable device to another is a simple matter of accessing a menu containing the list of the controllable devices for which software has been loaded. Utilizing a watertight housing for the PDA and attaching a flotational device to the housing can enable the remote control apparatus to be floated on the surface of the water in the event the remote control is to be used in a hot tub or the like.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
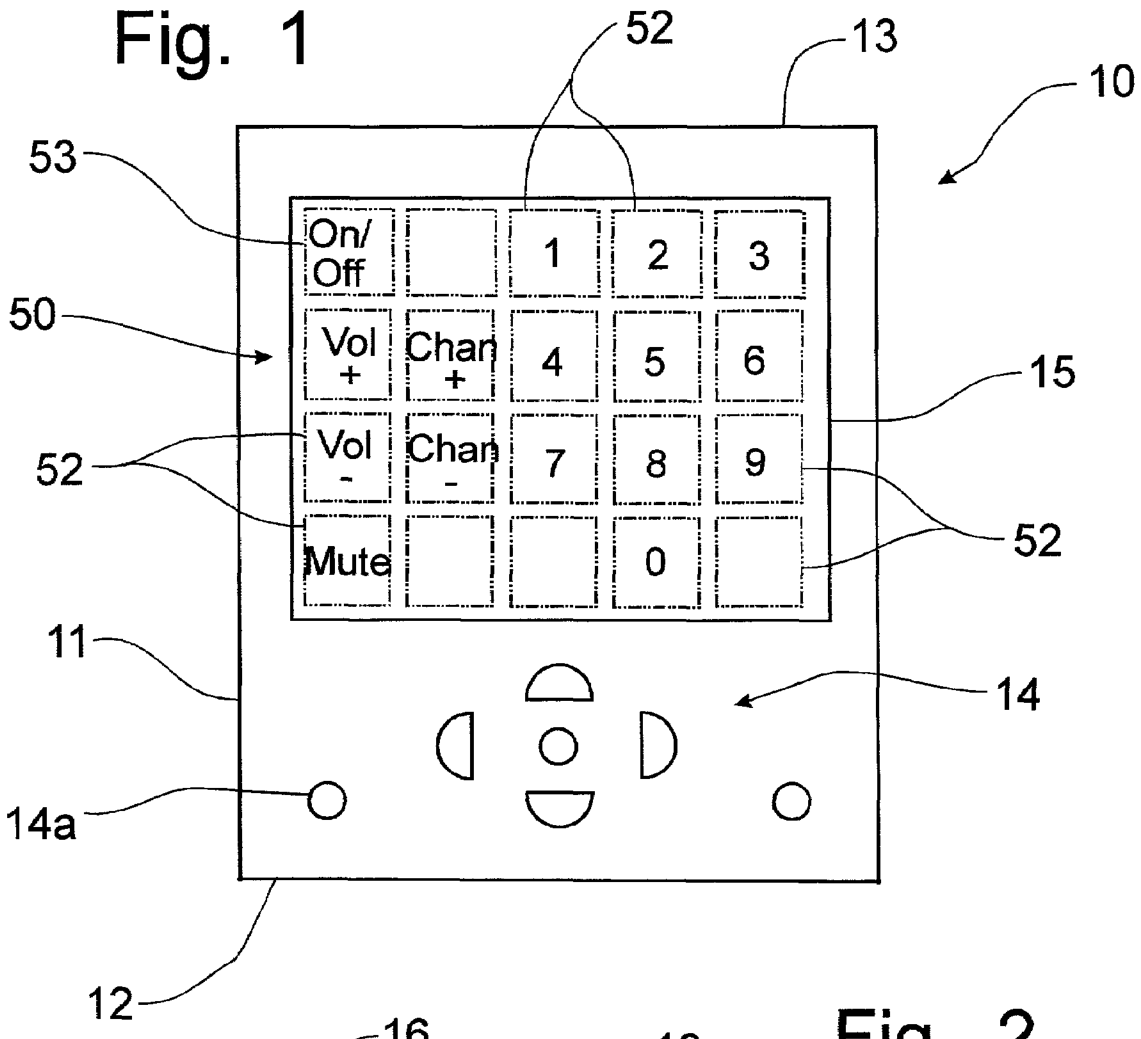
FIG. 1 is a schematic top plan view of a Personal Digital Assistant (PDA) adapted to perform as a universal remote control apparatus incorporating the principles of the instant invention.
Figure 2:
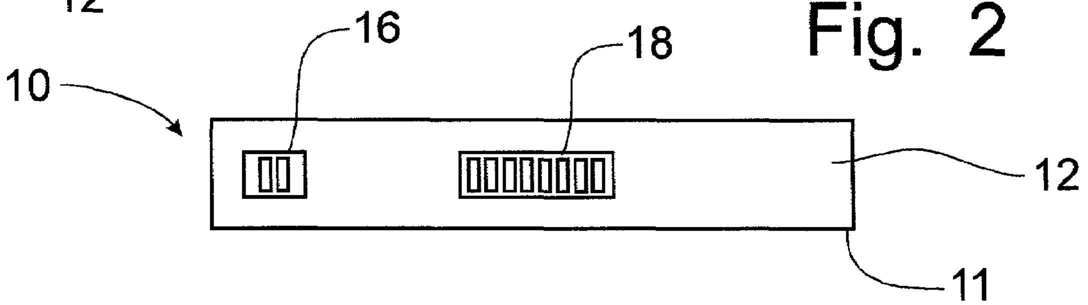
FIG. 2 is a schematic bottom end view of the PDA depicted in FIG. 1 to show the power port and the data port.
Figure 3:
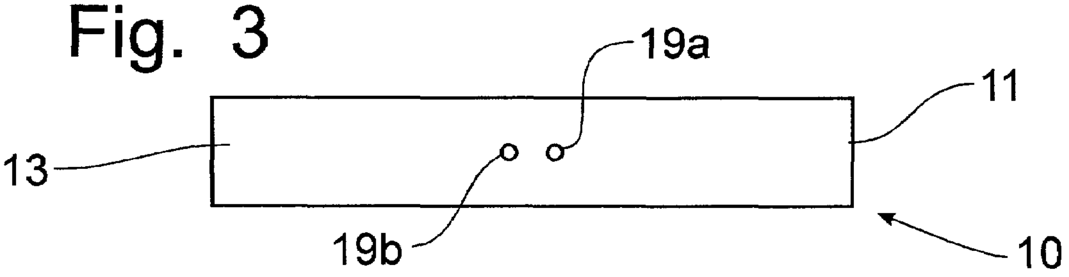
FIG. 3 is a schematic top end view of the PDA depicted in FIG. 1 to show the light emitting diodes (LED) for transmitting and receiving information to and from a controllable device by infra red beam.

Referring now to FIGS. 1–3, the utilization of a Personal Digital Assistant (PDA) to host a universal remote control apparatus 10 can best be seen. The remote control apparatus 10 is manufactured with a casing 11 in which a display screen 15 of generally conventional construction is housed. The casing 11 also mounts control buttons 14 for directional movement of a cursor on the display screen 15 and for the entry of commands, as well as a power on/off button **14*a*, all of which are well known and of conventional design and construction. One end 12 of the casing 11 includes a power port 16 and a data port 18 through which data can be transmitted via a cable 25 connected to a personal computer 30 or other data storage device. Contrary to conventional PDA design, the opposing end 13 of the casing 11 is configured with infra red diodes (LED's) 19*a*, 19*b* for the transmission and receipt of data via an infra red beam, as is known in conventional remote control apparatus. As with conventional PDA devices, the interior of the casing 11** is provided with memory storage devices (not shown) and a microprocessor (not shown) for executing software programming.

Figure 4:
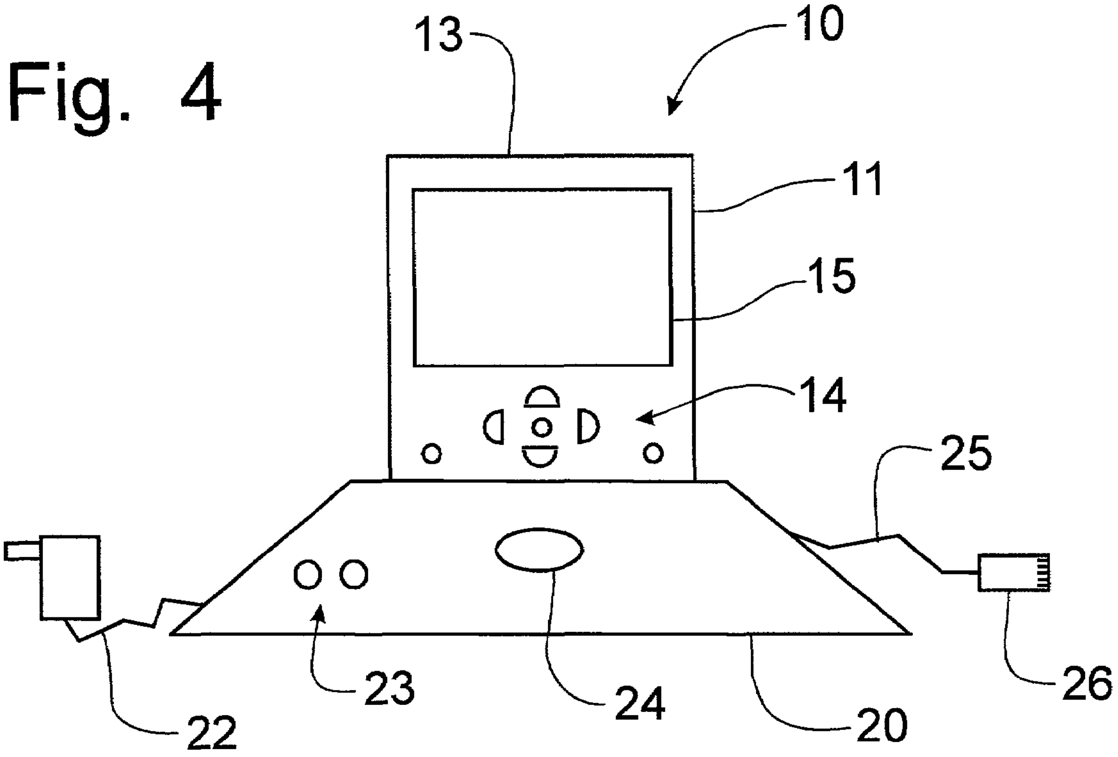
FIG. 4 is a schematic elevational view of a PDA universal remote control apparatus positioned in a docking cradle to receive downloadable software from a connection with a computer and to charge the batteries if rechargeable batteries are utilized in the PDA.

As is depicted in FIG. 4, the remote control apparatus 10 can preferably be supported in a docking cradle 20 which couples with both the power port 16 and the data port 18. The docking cradle 20 is preferably connectable to an AC electrical power supply via the power adapter and cord 22 to provide a source of electrical power to the remote control apparatus 10 connected to the docking cradle 20. Preferably, the remote control apparatus 10 is adapted to utilize rechargeable batteries which will be recharged while connected to the docking cradle 20 plugged into AC current. The docking cradle 20 is also provided with a data transfer cable 25, preferably having a USB connector 26 that will connect directly to a personal computer 30. The data cable 25 could also connect directly to the data port 18 instead of through the docking cradle 20. The docking cradle 20 would have typical power buttons and indicator LED's 23 and a button 24 for initiating the transfer of data into the PDA universal remote control apparatus 10.

Figure 5:
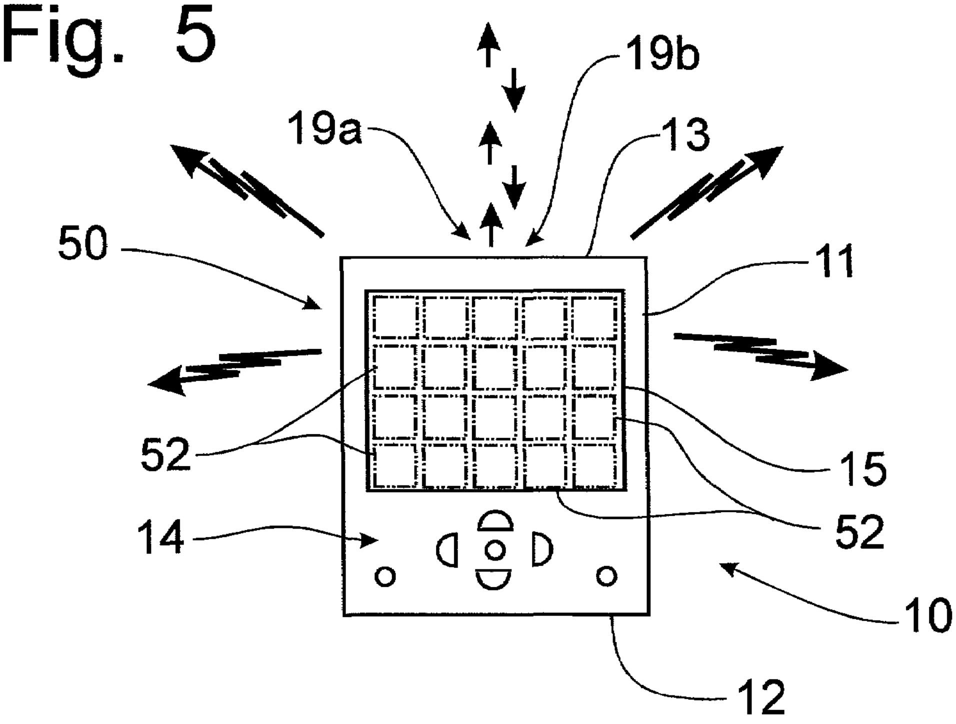
FIG. 5 is a diagrammatic plan view of a PDA universal remote control apparatus demonstrating dual operation via radio signal and infra red beam.

Internally of the casing 11, the remote control apparatus 10 is also provided with a radio signal transmitter (not shown) as is known in conventional remote control devices. As is depicted in FIG. 5, the remote control apparatus 10 is operable to send and receive data and commands via the infra red diodes **19*a*, 19*b*, and to send and receive controller commands via radio signal at multiple frequencies at which conventional remote control devices are operable, thus providing a broad spectrum application. As is noted below, the receive LED 19*b* can be used to learn commands from a conventional remote control device 35, or to verify on the display screen 15** that the function selected has been properly initiated via a return signal from the remote apparatus being controlled.

Figure 6:
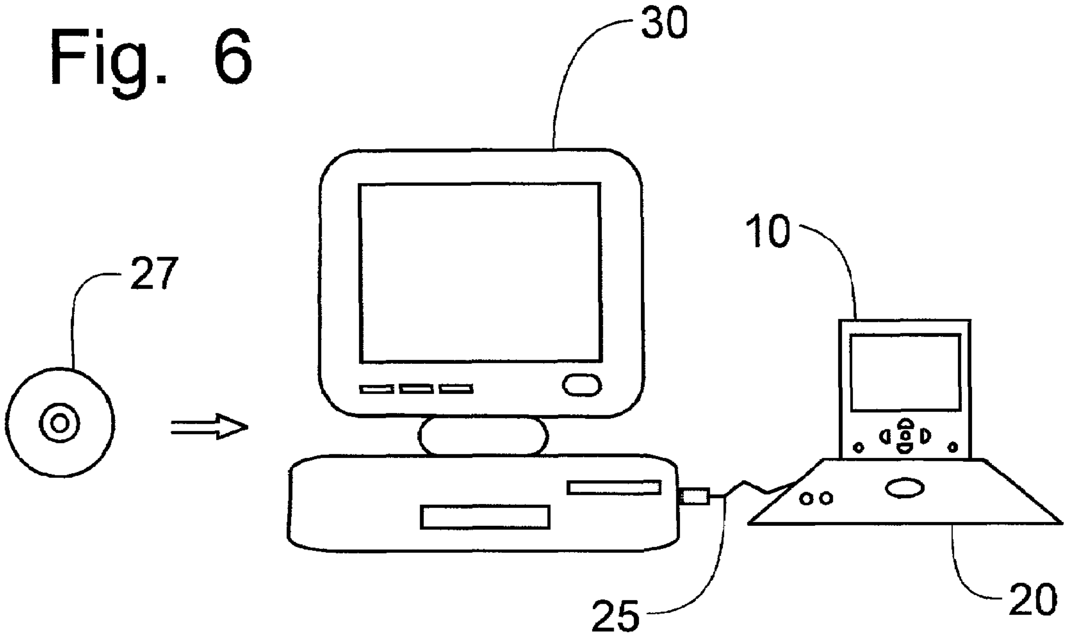
FIG. 6 is a diagrammatic view of the PDA universal remote control apparatus depicting the downloading of software from a memory storage device, such as a CDROM.

The remote control apparatus 10 is operable to store programming in the memory storage devices. The programming defines the manner in which the remote control apparatus 10 will operate. The programming for many different remote devices that are to be controlled can be stored in the memory storage devices within the remote control apparatus 10. The programming can be loaded into the memory storage devices in a number of different ways. As depicted in FIG. 6, one way for the programming to be loaded into the remote control apparatus 10 would be for the manufacturer of the machine or device to be controlled to provide a compact disk (CD) 27 with the proper programming stored thereof. The CD 27 could then be loaded into a personal computer 30 which is coupled via the data cable 25 to the remote control apparatus 10 either directly or via the docking cradle 20.

Figure 7:
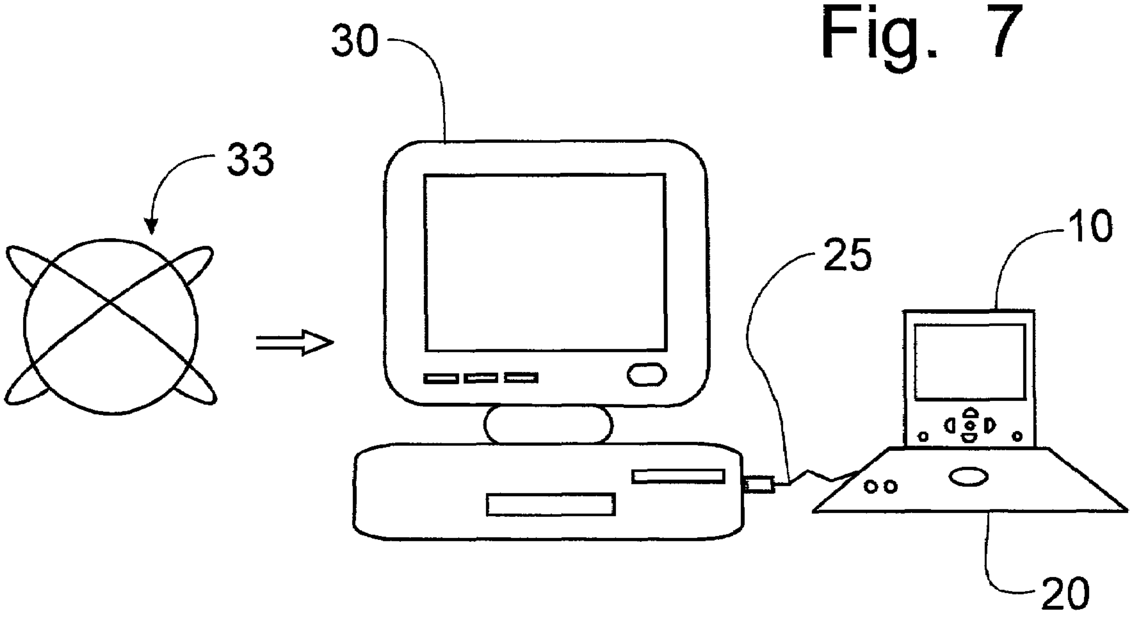
FIG. 7 is a diagrammatic view of the PDA universal remote control apparatus depicting the downloading of software from a manufacturer's web site or the Internet.
Figure 8:
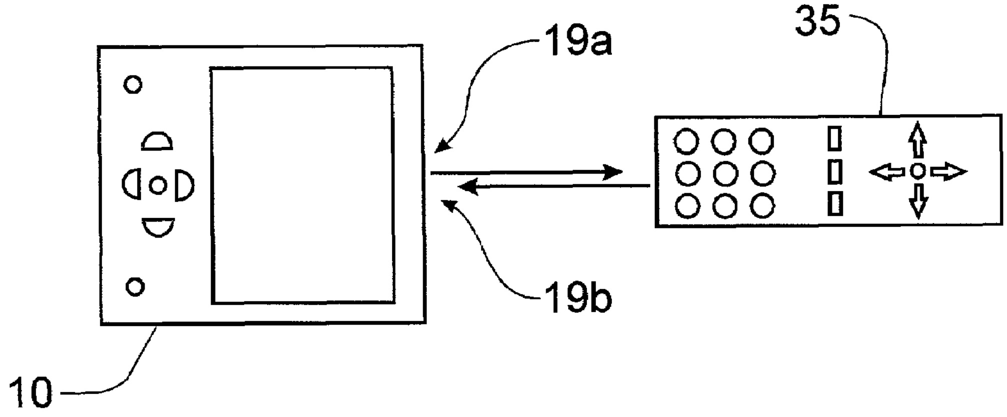
FIG. 8 is a diagrammatic plan view of a PDA universal remote control apparatus operated in a learn mode to receive coded control signals from the infra red transmitting function of a standard infra red remote control apparatus.

Probably the most effective manner in which the programming can be loaded into the remote control apparatus 10 would be via a web site 33 established by the manufacturer of the machine or device to be controlled as is depicted in FIG. 7. The web site 33 would be accessible via the Internet and could be updated by the manufacturer as need arises. As with the programming loaded on the CD 27, the download of the programming from the manufacturer's web site can be loaded into the remote control apparatus 10 via the data cable 25. Preferably, the remote control apparatus 10 will have a broad spectrum application and will also be operable as conventional remote control devices, as is depicted in FIG. 8, to receive data or commands from a conventional remote control device 35 through the infra red receiver 19*b* so that the remote control apparatus 10 can "learn" the requisite commands from an old remote control device 35.

Once loaded, the programming will provide a control panel 50 on the display screen 15 in the form of touch screen buttons or icons 52 to provide the manufacturer's control functions for the machine or device to be controlled. The programming will also define the manner in which the remote control apparatus 10 is to communicate with the machine or device to be controlled, i.e. whether control commands are to be broadcast via radio signal, and the frequency at which the signal is to be broadcast, or whether the control commands are to be sent via an infra red beam through the transmitting diode 19*a*. Preferably, the remote control apparatus 10 will have the built-in capability to allow the owner to modify the control panel 50 of touch screen buttons 52 on the display screen 15. In this manner the remote control apparatus 10 can truly be customized at the desire of the owner.

When multiple machines or devices are to be controlled through the remote control apparatus 10, the boot-up screen to be displayed on the display screen 15 when the remote control apparatus 10 is first powered-up should be a menu of the machines or devices that can be controlled. By selecting the desired machine or device, the remote control apparatus 10 will load into operation the programming for the selected machine or device, as customized by the owner, to display the touch screen buttons or icons 52 for the functions to be controlled on that particular selected machine or device. Returning to the menu screen, other machines or devices could be selected allowing the remote control apparatus 10 to toggle from one control mode to another. For each control mode, corresponding to a particular machine or device to be controlled, the display screen 15 will provide the control panel 50 that is peculiar to the machine or device that was selected. Each control panel 50 can be completely different from each other control panel 50 to be displayed on the display screen 15.

For example, a homeowner could have electrical switches installed in his house, a hot tub, a television, a stereo and a ceiling fan, all of which are capable of having functions thereof controlled through a remote control device. The homeowner places the remote control apparatus 10 into the docking cradle 20 and connect the docking cradle 20 to his personal computer 30 on which he accesses the manufacturer of each of the above-identified devices and downloads programming for each particular device into the remote control apparatus 10. The homeowner then takes the remote control apparatus 10 to the room in his house in which all of these devices are situated. Powering up the remote control apparatus 10 and selecting the hot tub on the menu screen, the homeowner can touch the on/off button or icon 53 on the control panel 50 displayed on the display screen 15 and turn-on the hot tub by a radio signal transmitted by the remote control apparatus 10 that communicates with the power switch on the hot tub. The homeowner can then re-access the menu screen and select the television selection which then loads the appropriate programming into the microprocessor and displays a control panel 50 for the television. Touching the proper control panel button 53 to initiate power into the television results in a command being transmitted via the infra red beam through the transmitter diode that communicates with the power switch of the television. The software programming defines the mode of the command signal to be transmitted to the remote apparatus.

Similarly, the same remote control apparatus 10 can be manipulated to display a control panel 50 for the light switches to dim the lights, for example, and, on a separate display screen, to control the operating speed of a ceiling fan. For devices, such as lighting switches and ceiling fans, that do not have a large number of control buttons, the remote control apparatus 10 could be operable to display on the display screen 15 more than one control panel 50 at a time, such as on a split screen. By using the control buttons 14 on the remote control apparatus 10, the control panels 50 and other touch screen icons 52 for different devices and different functions can be toggled through from one to another. Such a remote control apparatus 10 would be truly a universal remote control capable of controlling every remotely controlled machine or device for which the programming can be loaded into the memory storage devices and executed by the microprocessor, or which can be "taught" from a conventional infra red remote control device.

Figure 9:
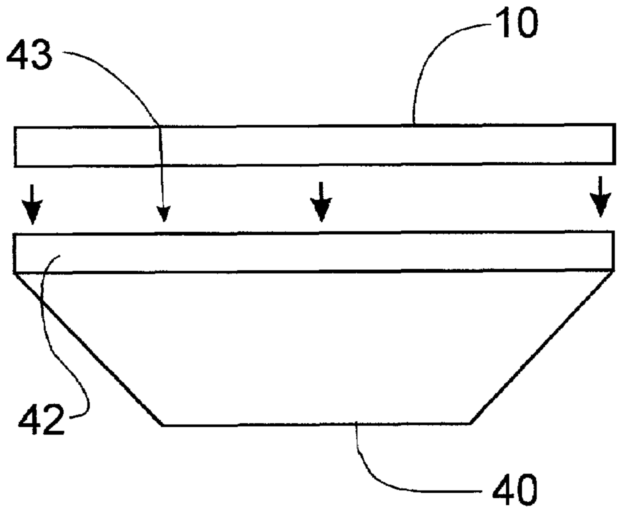
FIG. 9 is a schematic side elevational view of a flotational device adapted to receive a PDA universal remote control apparatus to permit the apparatus to float on the surface of water.
Figure 10:
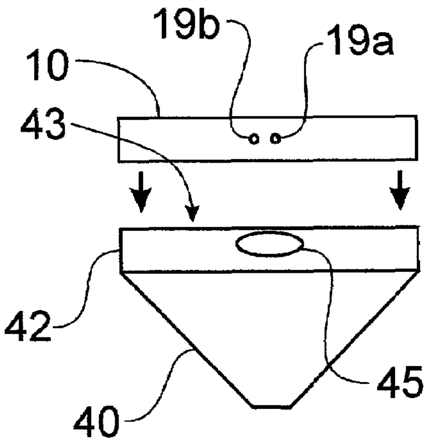
FIG. 10 is a schematic end view of the flotational device shown in FIG. 7 with a transparent window incorporated to permit the passage of the infra red beam from the PDA universal remote control apparatus.

As depicted in FIGS. 9 and 10, the remote control apparatus 10 is preferably manufactured with a watertight casing 11 that can be fitted to sit into a buoyancy holder 40 that will enable the remote control apparatus 10 to float on the surface of water, such as would be convenient for use in a hot tub, for example. The remote control apparatus 10 would preferably press fit into the top portion of the buoyancy holder 40 so as to fit snugly within the cavity 43 provided on the top thereof. One of the upright walls 42 of the cavity 43 is provided with a transparent window 45 which would align with the transmitter and receiver diodes 19*a*, 19*b* to enable the remote control apparatus 10 to communicate with the requisite machines or devices via an infra red beam. The remote control apparatus 10 can then be removed from the buoyancy holder 40 when use over water is not desired.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A universal remote control apparatus comprising:

a casing;

memory storage unit housed within said casing operable to store software programming corresponding to multiple remote devices to be controlled by said universal remote control apparatus;

a microprocessor housed within said casing and being cooperable with said memory storage unit to execute said software programming;

a display screen capable of displaying touch screen buttons operable to initiate commands to said microprocessor for operation of said software programming, said display screen being operable to display touch screen buttons corresponding to more than one remote device simultaneously;

an electrical power device to provide electrical power for operating said microprocessor;

a data transfer device operably coupled with said microprocessor for transferring data, including software programming, from a remote source to said microprocessor for storage in said memory storage unit; and a control command transmitter to provide simultaneous functionality in that said control command transmitter is operable to transmit said commands to multiple remote devices simultaneously via said infra red beam transmitter and said radio signal transmitter, as well as being operable to transmit said commands at multiple radio frequencies corresponding to multiple said remote devices, to control selectively the operation of said remote devices individually as well as simultaneously.

2. The universal remote control apparatus of claim 1 wherein said microprocessor can display a menu on said display screen to permit selection of one or more of said multiple remote devices stored within said memory storage unit.

3. The universal remote control apparatus of claim 2 further comprising a docking cradle for receiving said universal remote control apparatus, said docking cradle including a data transfer cable to interconnect said data transfer device and said remote source.

4. The universal remote control apparatus of claim 3 wherein said electrical power device includes rechargeable batteries, said docking cradle including a power adapter for recharging said rechargeable batteries.

5. The universal remote control apparatus of claim 1 wherein said casing is mountable in a buoyancy holder to permit said casing to float on top of water, said buoyancy holder including an upright wall having a transparent window therein for communication between said control command transmitter and said remote devices.

6. A method of controlling a remote device comprising the steps of:

providing a remote control apparatus having a casing, a display screen mounted within said casing, a memory storage unit, and a microprocessor;

storing software programming from a remote source into said memory storage unit, said software programming corresponding to multiple remote devices to be operatively controlled by said remote control apparatus;

loading said software programming into said microprocessor to cause a display of touch screen buttons on said display screen, each of said touch screen buttons being operable to initiate a command for controlling a function of at least one of said remote devices, said touch screen buttons selectively corresponding to one or more of said remote devices; and selecting a control command transmitter including an infra red beam transmitter and a radio signal transmitter for sending said command to said remote apparatus, the selection of said control command transmitter being determined by said software programming specific to the selected said remote device and being capable of simultaneous functionality in that said control command transmitter is operable to transmit said commands to multiple remote devices simultaneously via said infra red beam transmitter and said radio signal transmitter, as well as being operable to transmit said commands at multiple radio frequencies corresponding to multiple said remote devices.

7. The method of claim 6 wherein said method further comprises the step of:

providing a menu on said display screen of said multiple remote apparatus to permit a selection of one of said remote devices for the display of said touch screen buttons corresponding thereto on said display screen.

8. The method of claim 6 further comprising the step of:

obtaining said software programming from a connection with a web site corresponding to said remote device via a personal computer.

9. The method of claim 6 further comprising the step of:

obtaining said software programming from a remote memory storage device loaded into a personal computer.

10. The method of claim 6 further comprising the step of:

learning said control commands from a remote control device corresponding to said remote device.

11. The method of claim 10 wherein said learning step includes the step of transferring control commands through an infra red beam transmitted by said remote control device and received by an infra red receiver in said remote control apparatus.

12. The method of claim 6 further comprising the step of:

selecting the operative function of each touch screen button corresponding to a selected remote device to provide a customized control panel of touch screen buttons on said display screen.

13. A universal remote control apparatus for controlling a remote apparatus comprising:

a casing having a display screen mounted therein;

a microprocessor housed within said casing to receive and operate software programming corresponding to said remote apparatus, said microprocessor being operable to display on said display screen touch screen icons corresponding to commands for controlling various operative functions of said remote apparatus;

a data transfer device operatively coupled to said microprocessor to receive software programming from a remote source corresponding to said remote apparatus; and a command transmitter mounted in said casing and being cooperable with said microprocessor to send a command selected by an operator touching one of said touch screen icons to initiate a control of an operative function of said remote apparatus, said command transmitter including an infra red beam transmitter and a radio signal transmitter, said command transmitter being capable of simultaneous functionality such that said microprocessor is operable to select one of said infra red beam transmitter and said radio signal transmitter according to the software being executed by said microprocessor, as well as transmit commands via both said infra red beam transmitter and said radio signal transmitter simultaneously to control multiple remote apparatus.

14. The universal remote control apparatus of claim 13 wherein said radio signal transmitter is operable to transmit commands at multiple frequencies simultaneously via said radio signal transmitter according to the software being executed by said microprocessor to control corresponding multiple remote apparatus.

15. The universal remote control apparatus of claim 14 wherein said data transfer device is connectable to a personal computer by a data transfer cable to load software programming therefrom into said microprocessor.

16. The universal remote control apparatus of claim 15 wherein said personal computer obtains said software programming from a web site on the Internet.

17. The universal remote control apparatus of claim 15 further comprising a memory storage unit to store software programming for multiple remote apparatus, said microprocessor being operable to display a menu of said multiple remote apparatus to permit said operator to select a remote apparatus to be controlled.

18. The universal remote control apparatus of claim 17 wherein said universal remote control apparatus is cooperable with a docking cradle having said data transfer cable connected thereto to transfer software programming into said microprocessor.

19. The universal remote control apparatus of claim 18 further comprising an electrical power source including rechargeable batteries, said docking cradle including a power adapter to convert AC electrical current into DC electrical current for recharging said rechargeable batteries when said universal remote control apparatus is received in said docking cradle.

* * * * *